United States Patent
Henry

(10) Patent No.: US 9,888,213 B2
(45) Date of Patent: Feb. 6, 2018

(54) METHOD FOR DISPLAYING A MOSAIC IMAGE A RECEIVER FOR THE SELECTION OF AUDIOVISUAL PROGRAMS, RECEIVERS AND RELATED SERVERS

(75) Inventor: Jean-Baptiste Henry, Melesse (FR)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 1348 days.

(21) Appl. No.: 12/308,315

(22) PCT Filed: Jun. 13, 2007

(86) PCT No.: PCT/EP2007/055787
§ 371 (c)(1),
(2), (4) Date: Dec. 12, 2008

(87) PCT Pub. No.: WO2007/144361
PCT Pub. Date: Dec. 21, 2007

(65) Prior Publication Data
US 2010/0242080 A1    Sep. 23, 2010

(30) Foreign Application Priority Data
Jun. 15, 2006 (FR) .................... 06 52141

(51) Int. Cl.
*H04N 7/173* (2011.01)
*H04N 5/44* (2011.01)
(Continued)

(52) U.S. Cl.
CPC ....... *H04N 7/17318* (2013.01); *H04N 5/4401* (2013.01); *H04N 5/45* (2013.01);
(Continued)

(58) Field of Classification Search
CPC .... H04N 5/4401; H04N 5/45; H04N 7/17318; H04N 21/234363; H04N 21/8153;
(Continued)

(56) References Cited

U.S. PATENT DOCUMENTS 5,583,560 A    12/1996    Florin et al.
5,822,014 A    10/1998    Steyer et al.
(Continued)

FOREIGN PATENT DOCUMENTS

CN    1161767    10/1997
EP    0788711    8/1997
(Continued)

OTHER PUBLICATIONS

Search Report Dated Aug. 10, 2007.
(Continued)

*Primary Examiner* — Nathan Flynn
*Assistant Examiner* — Christine Kurien
(74) *Attorney, Agent, or Firm* — Tutunjian & Bitetto, P.C.

(57) ABSTRACT

The present invention makes it possible to present a mosaic image to a user of an audiovisual receiver. The method comprises a step for generating a list of at least one audiovisual channel in order to display its content in a mosaic image. Then, the list is transmitted to a server which then transmits visual data associated with each channel in the list. The visual data is aggregated in order to form a mosaic image which is then displayed at the level of the receiver. According to a first embodiment, the mosaic image is produced at the level of the receiver. According to another embodiment, the mosaic image is created at the level of the server before being transmitted. According to a refinement, a channel is graphically highlighted at the level of the mosaic image, the receiver receives either the audio stream or the video stream or both of the highlighted channel.

Figure 1:
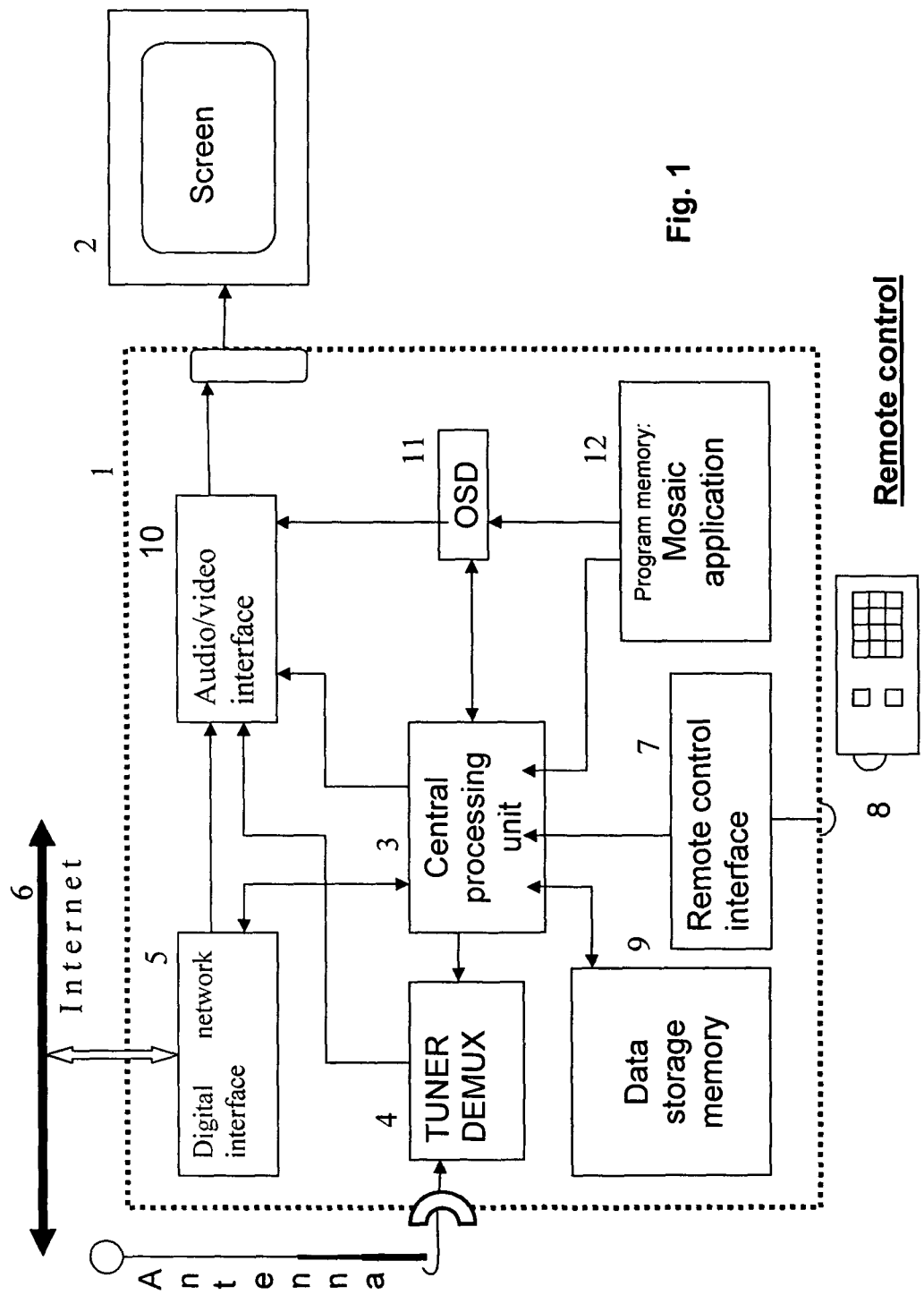

The invention also relates to the receiver able to implement the method.

11 Claims, 3 Drawing Sheets

(51) Int. Cl.
  *H04N 5/45* (2011.01)
  *H04N 21/2343* (2011.01)
  *H04N 21/2665* (2011.01)
  *H04N 21/4402* (2011.01)
  *H04N 21/45* (2011.01)
  *H04N 21/482* (2011.01)
  *H04N 21/485* (2011.01)
  *H04N 21/658* (2011.01)
  *H04N 21/81* (2011.01)
  *H04N 5/50* (2006.01)

(52) U.S. Cl.
  CPC . *H04N 21/234363* (2013.01); *H04N 21/2665* (2013.01); *H04N 21/440263* (2013.01); *H04N 21/4532* (2013.01); *H04N 21/4821* (2013.01); *H04N 21/4858* (2013.01); *H04N 21/6581* (2013.01); *H04N 21/8153* (2013.01); *H04N 5/50* (2013.01)

(58) Field of Classification Search
  CPC ....... H04N 21/440263; H04N 21/4532; H04N 21/4821; H04N 21/4858; H04N 21/6581; H04N 21/2665
  USPC ...................................................... 725/37–61
  See application file for complete search history.

(56) References Cited

U.S. PATENT DOCUMENTS

| | | |
|---|---|---|
| 6,323,877 B1 | 11/2001 | Katoh et al. |
| 2001/0042019 A1 | 11/2001 | Omachi |
| 2002/0067376 A1* | 6/2002 | Martin et al. .................. 345/810 |
| 2005/0028203 A1 | 2/2005 | Kim |
| 2006/0200842 A1* | 9/2006 | Chapman et al. .............. 725/34 |
| 2007/0204297 A1* | 8/2007 | Gonzalez ........................ 725/41 |

FOREIGN PATENT DOCUMENTS

| | | |
|---|---|---|
| FR | 2713427 | 6/1995 |
| FR | 2812160 | 1/2005 |
| JP | 8506469 | 7/1996 |
| JP | 8307786 | 11/1996 |
| JP | 10187760 | 7/1998 |
| JP | 2001326868 | 11/2001 |
| JP | 2003116073 | 4/2003 |
| JP | 2003308149 | 10/2003 |

OTHER PUBLICATIONS

European Telecommunications Standards Institute, Digital Video Broadcasting (DVB); Specification for Service Information (SI) in DVB systems, Feb. 1998.

* cited by examiner

_US 9,888,213 B2_

METHOD FOR DISPLAYING A MOSAIC IMAGE A RECEIVER FOR THE SELECTION OF AUDIOVISUAL PROGRAMS, RECEIVERS AND RELATED SERVERS

This application claims the benefit, under 35 U.S.C. §365 of International Application PCT/EP2007/055787, filed Jun. 13, 2007, which was published in accordance with PCT Article 21(2) on Dec. 21, 2007 in French and which claims the benefit of French patent application No. 06 52141, filed Jun. 15, 2006.

The invention relates to a method of displaying a mosaic image personalized to a user in an audiovisual receiver and an audiovisual receiver provided with such a display method.

These days, a digital transmission network transmits audiovisual programs intended to be viewed on audiovisual receivers, and service information making it possible in particular to select the programs, for example using an Electronic Program Guide. Patent FR2 713 427 filed by the applicant and published on 9 Jun. 1995 describes a method of displaying a mosaic image and of selecting programs using this image. According to this prior art, the transmitter transmits a mosaic image consisting of small images or "thumbnails", each thumbnail graphically identifying a program currently being transmitted, and a mapping table making it possible to associate the transmitted program and the position of the thumbnail in the mosaic image. The visual content of the thumbnail generally represents the image currently transmitted in the audiovisual program transmitted by an analogue channel or a digital service. The mosaic images are transmitted in a video stream generated by the program transmitter. They are produced by reducing the size of the images originating from several video sources and by assembling them together. The application in the audiovisual receiver detects the reception of a mosaic image and displays it on the screen. The user selects a thumbnail by moving a cursor using direction keys, the result of which is to highlight the thumbnail (by showing a box frame, or by applying a highlight to it, or even by making it blink). Then the user presses the activation key (key generally designated "OK"), the application then searches in the mapping table for the transmission parameters of the program associated with this thumbnail.

In the digital domain, the parameters are the reference of the transmission channel and the values of the PIDs of the audiovisual stream. The network (terrestrial, satellite or cable) transmits audiovisual programs more commonly called "services" and data intended to reference them. This data is, for example, defined in the DVB-SI ("Digital Video Broadcast—specification for Service Information") EN 300 468 V1.3.1 (published by the ETSI). In the analogue domain, the channel can be identified by its frequency. With these parameters, the application programs the demodulator and/or the filter of the audiovisual receiver to extract the signals and display them on a screen.

Since the mosaic image is designed at the level of the transmitter, the receiver can immediately display it without needing to subject it to any particular processing. All the audiovisual receivers receive the same mosaic image. It is therefore not possible to personalize this image according, for example, to the preferences of the user. The transmitter sends mosaic images for a set of programs transmitted in an order determined by the transmitter. At the level of the receiver, the application cannot parameterize the display according to the wishes of the user. The mosaic image therefore comprises thumbnails of all the programs transmitted, including those that the user never selects and in an order that has little chance of being that of his preferences.

The patent FR 2 812 160, published on 25 Jan. 2002 enables a user of a decoder to construct a mosaic image himself and according to his tastes. The mosaic image is generated at the level of the decoder from a selection entered by the user. In this way, the user chooses the services that he wants to see in the mosaic image. An application internal to the decoder recovers the data transmitted in different streams and generates a mosaic image from these data. However, it is not always possible for a receiver to recover audiovisual data transmitted by several different microwave services and channels, to assemble them in real time in order to produce a mosaic image.

Document US 2005/0028203, published on 23 Feb. 2005, discloses a data reception system in a decoder and an application for selecting audiovisual programs thanks to the transmission of a mosaic image. The aim of this invention is to listen to the audio content of the program which is selected in the mosaic image. The solution described consists in searching in the tables of the DVB-SI for the data packets that transport the audio component of the channel selected by the user. The data packets are then decoded and the sound is reproduced.

The present invention proposes a new user interface making it possible to display a mosaic image that is personalized according to the choices of the user at the level of a receiver.

The subject of the invention is a method of displaying a mosaic image in an audiovisual receiver (1); comprising a step for generating, at the level of said receiver, a list of at least two audiovisual channels, characterized in that it comprises the following steps:

transmission (4.3) to a server (20) of at least two identifiers identifying each audiovisual channel in the list, reception (4.5) of visual data associated with each identified channel from the server, aggregation (4.6) in the receiver of the visual data received in order to form a mosaic image, display (4.7) at the level of the receiver of the mosaic image produced.

In this way, the mosaic image is personalized to an audiovisual receiver from the list of audiovisual channels generated in this receiver. Each personalized mosaic image is generated at the level of the receiver, thus avoiding requiring the server to carry out the aggregation operation. All the data transmitted between the receiver and the server are used to display the mosaic image, thus optimizing the bandwidth of the communication network.

According to a refinement, the method comprises a step for transmission by the server of a stream of images associated with each channel in the list. The images are then aggregated at the level of the receiver in order to form a mosaic image stream. In this way, the receiver receives a continuous stream and no longer needs to send requests continually. According to another refinement, the method comprises a step for receiving the audio stream corresponding to the current audiovisual channel, this channel being graphically highlighted. In this way, the user can listen to the audio content associated with the channel that is highlighted in the mosaic. The audio stream can be transmitted by the server, or received via a transmission network.

According to another refinement, the method comprises a step for reception of the video stream corresponding to this current audiovisual channel sent by the server, said video stream being received from a transmission network, this channel being graphically highlighted in the mosaic. In this way, the user can see an animated video associated with the channel that is highlighted in the mosaic. According to another refinement, the method comprises a step for temporarily storing a mosaic image, the mosaic image being displayed after a determined time following the reception of all the visual data forming said mosaic image. In this way, the user can see a regular updating of the mosaic image, which is freed of the constraint of receiving visual data.

According to another refinement, a new mosaic image is displayed following each reception of visual data associated with an identified channel. In this way, the mosaic image changes each time a visual datum is received and offers a certain visual attraction.

Another subject of the invention is a method of displaying a mosaic image at the level of an audiovisual receiver; comprising a step for generating at the level of said receiver a list of at least two audiovisual channels, characterized in that it comprises the following steps:

transmission to a server of at least two identifiers identifying each audiovisual channel in the list,
  aggregation in the server of the visual data received in order to form a mosaic image,
  reception of the mosaic image in the receiver,
  display of the received mosaic image.

In this way, the personalized mosaic image uses remote graphic resources, which frees the receiver of this task. According to a refinement, the server generates a mosaic image stream and transmits the stream data to the receiver. In this way, the receiver receives a continuous mosaic image stream and no longer needs to continually send requests.

Another subject of the invention is an audiovisual receiver comprising a first means of generating a list of at least two audiovisual channels; characterized in that it comprises a means of transmission to a server of at least two identifiers identifying each audiovisual channel in the list, a means of receiving visual data associated with each identified channel, a means of aggregating the visual data received in order to form a mosaic image, and a means for transmitting the mosaic image produced for display purposes.

Another subject of the invention is a communication server comprising a means of communicating with an identified audiovisual receiver; characterized in that the communication means receives a list of at least two identifiers identifying at least two audiovisual channels, a means of aggregating visual data associated with each identified channel in order to form a mosaic image, the communication means transmitting to the identified receiver the mosaic image produced for display purposes.

Figure 2:
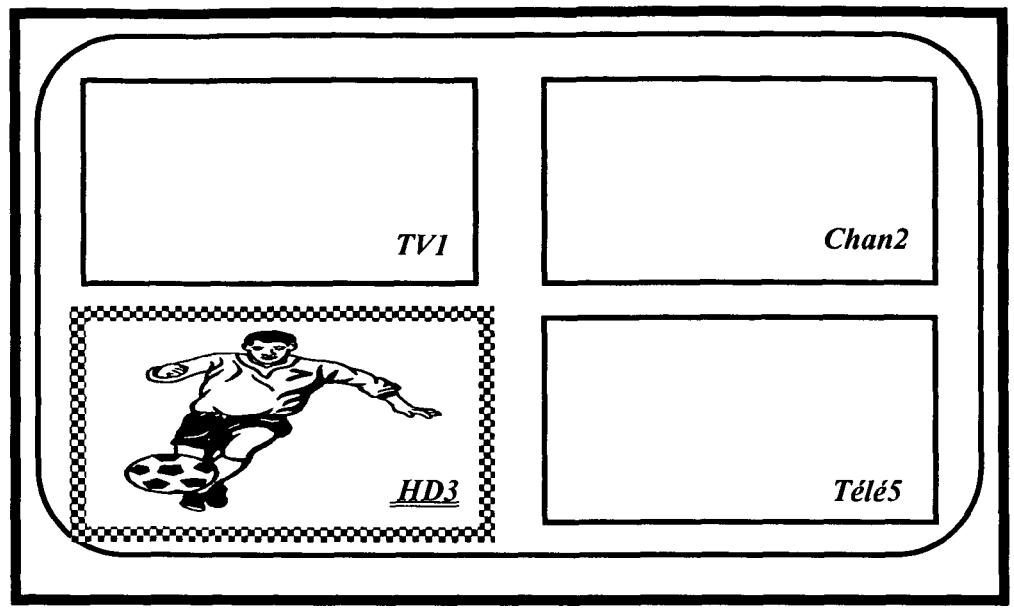
Figure 3:
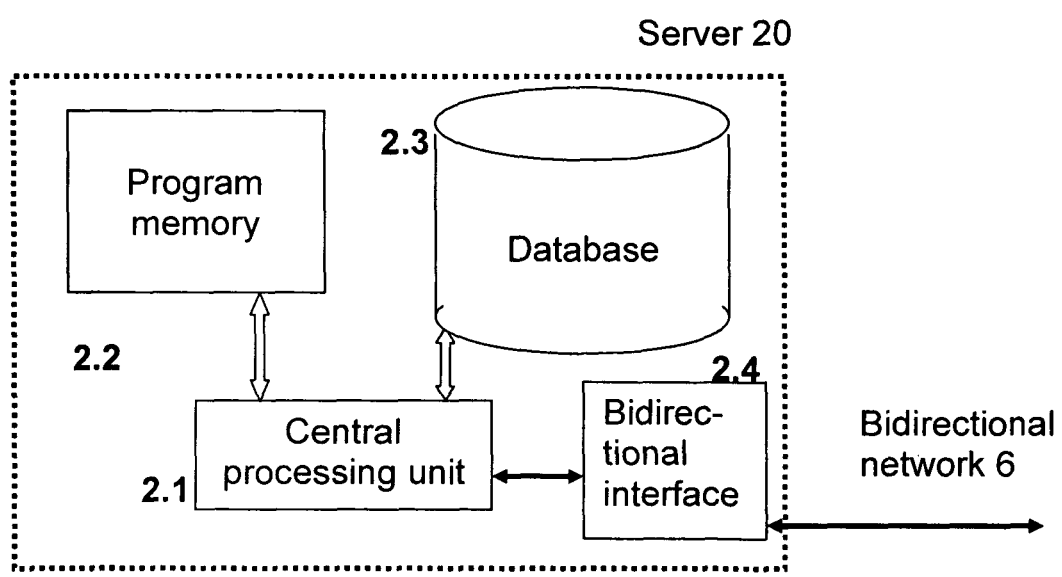
Figure 4:
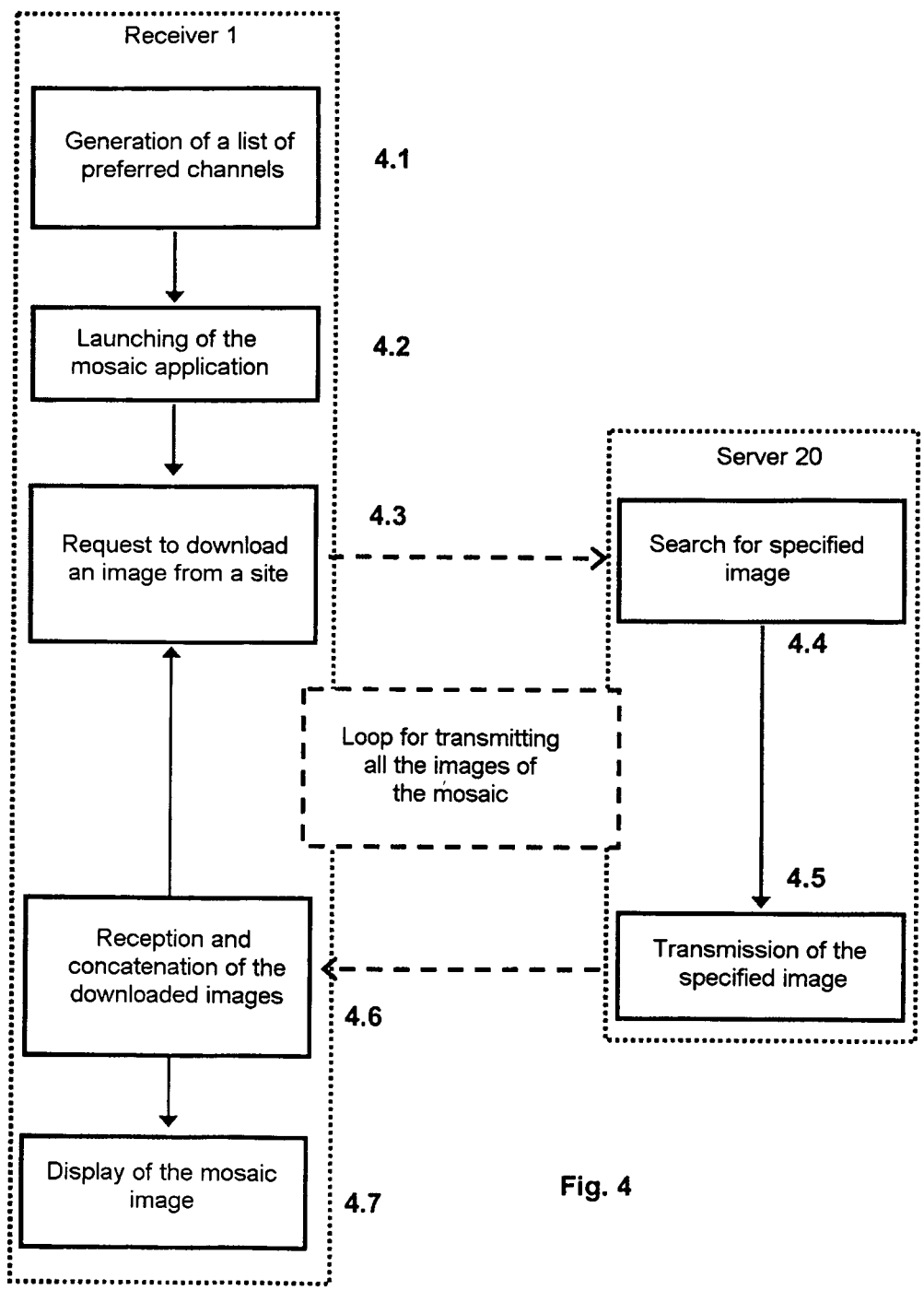

Other characteristics and advantages of the invention will now become apparent with more details in the context of the description which follows of exemplary embodiments given by way of illustration by referring to the appended figures which represent:

FIG. 1, a block diagram of an audiovisual receiver for implementing an exemplary embodiment of the invention, FIG. 2, a mosaic image comprising four small images representing channels or services, FIG. 3, a diagram showing the different elements of a server according to the invention, FIG. 4, the main interchanges between the user's receiver and the server, according to one exemplary embodiment of the invention.

Using FIG. 1, the operation of an audiovisual receiver 1 connected to a display device 2 will first of all be described. The audiovisual receiver 1, for example a decoder, also called "set top box", comprises a central processing unit 3 linked to a program memory 12, reception means such as a demodulator 4 and a demultiplexer for receiving audio/video data from a transmission network via a receiving antenna. The receiver 1 is preferably of digital type and receives digital audiovisual services, but the invention can also be used in an analogue-type receiver receiving channels transmitted by microwave channels. As a variant, the receiver 1 can be provided with an interface 5 for communication with a broadband access digital network 6 making it possible to transmit audio/video data in real time. This network is, for example, the Internet. The central processing unit must have high processing power to perform rapid image processing, for example 200 Mips. The receiver 1 also comprises an infrared signal interface 7 for receiving signals from a remote control 8, a memory 9 for storing service data, and an audio/video decoding logic 10 for generating audiovisual signals sent to the television screen 2. The remote control 8 is provided with direction keys: ↑, ↓, →, ← and with the key: "OK" whose roles will be explained later.

The receiver 1 also comprises a circuit 10 for directly displaying the audiovisual transmissions received by the transmission network or by the digital bus 6, and a data embedding circuit 11, often called OSD circuit, standing for "On-Screen Display". The OSD circuit 11 is a text and graphics generator which makes it possible to display on the screen menus, pictograms (for example, a number corresponding to the channel being viewed) and images, and which makes it possible to display the different screens according to the present invention. The OSD circuit is controlled by the central processing unit 3 and a mosaic application contained in the memory 12. This application is either resident in a ROM memory, or downloaded and saved in a writable memory. A variant involves having the mosaic application produced in the form of an ASIC-type custom circuit for example.

The network (terrestrial, satellite or cable) transmits audiovisual programs more commonly called "services" and data intended to reference them. These service data are, for example, defined in the DVB-SI specifications cited in the preamble. They take the form of tables and descriptors which describe the objects transmitted over the transmission network. Among the tables defined by the DVB-SI standard, the SDT table gives additional information relating to the services, for example the plain-language name of a service. According to a preferred exemplary embodiment, the SDT table transmits a mapping table specifying the URLs for accessing the mosaic information according to the audiovisual services. There follows an example of a mapping table according to the invention:

TABLE 1

| Service | Image URL | Audio URL |
| --- | --- | --- |
| 101 | http://tV1.com/image | http://TV1.com/audio |
| 103 | http://Chan2.com/image | http://Chan2.com/audio |
| 202 | http://HD3.com/image | http://HD3.com/audio |
| 205 | http://Canal4.com/image | http://Canal4.com/audio |
| 281 | http://Télé.com/image | http://Télé5.com/audio |

By reading the mapping table, the receiver can use the Internet to launch a request to the specified URL, ask to receive the visual data that can be used to form the mosaic image, and, optionally, receive an audio stream of a channel or a digital service. If the receiver 1 is of analogue type, the identification of the channel is the frequency of the transmission channel.

Advantageously, the mapping table is transmitted on all the services so that, regardless of the service selected by the user, the decoder can receive it. The last table received replaces the preceding one stored in the memory 9 of the receiver. If we assume that the mosaic application displays four images, here is an example of a table in memory 9:

TABLE 2

| Image location | Service | Image URL | Audio URL |
|---|---|---|---|
| 1.1 | 101 | http://TV1.com/image | http://TV1.com/audio |
| 2.1 | 103 | http://Chan2.com/image | http://Chan2.com/audio |
| 1.2 | 202 | http://HD3.com/image | http://HD3.com/audio |
| 2.2 | 281 | http://Télé5.com/image | http://Télé5.com/audio |

FIG. 2 shows a screen appearance displaying a mosaic image with four images respectively associated with the channels: "TV1", "Chan2", "HD3", "Télé5". In table 2, the first column determines the location of the image in the mosaic image. The first numeral expresses the number of the column starting from the left, the second numeral is that of the row starting from the top of the image.

The receiver 1 communicates via its communication interface 5, via the network 6, with one or more communication servers 20, an exemplary embodiment of which is described by FIG. 3. A server 20 comprises a central processing unit 2.1, a program memory 2.2 comprising an encoding program, a database 2.3 containing the audiovisual data to be transmitted and a communication interface implementing a plurality of bidirectional links 2.4 via the network 6 with the receivers described previously. The server 20 receives from a transmitter all the programs and channels from the bouquet of programs. The network head produces a low-resolution stream and transmits it to encoding logic 2.3 of the server. This reduced stream transmits images that can be used to produce a program mosaic image. In the example illustrated by table 2, the mosaic image comprises four images. The user himself determines the position of the images in the mosaic image using a graphics screen management program that is well known to those skilled in the art.

After having described the various elements, we will now explain how they cooperate.

The progress of the various interchanges is illustrated by FIG. 4. In the step 4.1, the receiver 1 generates the list of audiovisual channels or services identified by images within its personal mosaic image. The list can be entered by user selections from an Electronic Program Guide. Another method involves using a user profile, the list comprising the audiovisual channels or services most often selected by the user.

Then the user launches the mosaic application (step 4.2) by entering a command. The application reads the content of the table and launches all the requests to download images from sites ending with "/image" and for which the URL is described in the table in memory. In the example of a mosaic image of 4 images, the mosaic application launches the following four requests:

Req (http://TV1.com/image)
Req (http://Chan2.com/image)
Req (http://HD3.com/image)
Req (http://télé5.com/image)

The servers 20 associated with each site receive the requests in the step 4.4 and search in the database 2.3 for the visual data. These visual data are then transmitted to the receiver 1 that made the request (step 4.5).

The receiver 1 waits for the responses to its requests. The servers representing the four sites return an image in JPEG form (step 4.4).

Once the visual data have been received, they are first decoded in order to produce images in the dimensions of the areas of the mosaic. Then, the mosaic application aggregates the four duly formed images, placing them according to the location specified in table 2:

the image originating from (http://tV1.com/image) top left,
the image originating from (http://Chan2.com/image) top right,
the image originating from (http://HD3.com/image) bottom left,
the image originating from (http://Télé5.com/image) bottom right.

The mosaic image produced in this way at the level of the receiver 1 is transmitted to the display means and displayed on the screen 2 (step 4.7).

In order to ensure a regular updating of the mosaic image, the mosaic application repeats in a loop the steps 4.3, 4.4, 4.5 and 4.6. For this, the image download requests are transmitted to the different sites at regular time intervals. According to a particularly simple embodiment of the invention, the receiver 1 transmits an image reception request to a site immediately it has received the image originating from the preceding request to this site. The receiver executes as many tasks in parallel as there are images in the mosaic. The updating of the images will be performed randomly according to the bandwidth of the network and the availability of the images on the sites. It is possible to avoid the irregular updating of the images by relaunching the round of requests at regular time intervals, for example each second. The response times for each site can vary, so the reception of the data is performed asynchronously. If the display occurs immediately after reception, the updating of the mosaic image will be jerky. A refinement involves waiting for all the visual data making it possible to form a mosaic image to be received in the receiver 1, then producing the mosaic image and storing it temporarily. The duly stored mosaic images are then displayed at regular time intervals. In the example cited above, each of the four images received is incorporated in the mosaic image. In this way, the rhythm of the display is made independent of the moment when the visual data are received. A refinement involves implementing a time offset between the received data and their displays within the mosaic image. This offset, typically 3 to 5 seconds, makes it possible to ensure a regular display unaffected by the request response times.

A variant consists in producing a mosaic image on each reception of visual data and displaying it, possibly after a temporary storage to allow for a regular rhythm of the display. In this way, for a new complete mosaic image, the display is modified four times, which seems more distracting to the user. In the example of a mosaic image consisting of four images received each second, the mosaic image is refreshed every quarter second.

The display and updating of the mosaic image continues until the user interrupts the process, either by switching off his appliance, or by selecting an image in order to view the corresponding channel or service, or quite simply by closing the mosaic application.

A refinement consists in receiving, in addition to the visual data, the audio stream corresponding to the channel or to the service highlighted in the mosaic image. Using the direction keys ↑, ↓, →, ← the user can highlight an image in the mosaic, and by pressing the "OK" key, the image of that channel or service appears full-screen. This corresponds to the action of selecting the service in question. The mosaic application reads the table 1 and searches the transmitting site for the audio stream corresponding to the channel or to the service whose image is highlighted and launches a request to generate a continuous stream transmitted by this site. The decoder then connects to the audio site transmitting a stream, for example thanks to a multicast data transmission, and asks for a communication to be opened, for example an RTSP-type session. The session protocol defined by an Internet standard, for example RFC 2326 for RTSP, defines the control (establishment, actions and end) of a client on a content server (in this case, the audio stream sent to the decoder). The audio data are decoded and the sound is sent to loudspeakers, synchronizing them as much as possible with the display of the images transmitted by the image site. The receiver 1 sends a request to terminate the transmission of the audio stream when the mosaic application is closed.

A refinement consists in replacing the requests to receive visual data for the channel or service highlighted in the mosaic image with the video stream of that channel or service. The mosaic application determines the highlighted image and reads table 1 in order to search the transmitting site for the video stream corresponding to the channel or to the service whose image is highlighted. Then, the mosaic application launches a request to establish a continuous stream transmitted by this site. A single site is sufficient, for example http://www.tfl.org/, the request is directed to different paths in the site, the URLs of the paths having the suffix "/image" or "/audio". Typically, for one site, there are three URLs: one for the images (suffixed by: /image), one for the audio (suffixed by /audio), one for the video (suffixed by /video).

A refinement consists in having different URLs according to the definition of the image: "/video/100 pixels" and "/video/200 pixels". This refinement equally concerns image requests and stream requests; in the latter case, the received video is more or less degraded. The transmission is performed in the same way as for the audio stream. The video data are decoded and embedded in the part of the mosaic image highlighted by the user. The video data of the stream are advantageously in MPEG format, which guarantees the transmission of a continuous stream. The transmission of a request to receive a video stream is performed on each change of position of the graphic distinction, a request to end transmission being sent when the graphic distinction leaves the image. When the user closes the mosaic application, the latter sends a request to terminate the transmission of the video stream. According to another refinement, the receiver 1 receives a low-resolution image stream. This type of image is compatible with the small image format of the mosaic. Moreover, its resolution does not make it possible to display it correctly full-screen on the display means 2, so it is therefore pointless to condition the transmission of the visual data on a pay access control. This refinement is particularly advantageous in as much as the transmission of low-resolution visual data optimizes the bandwidth.

According to an embodiment variant, the audio and/or video information of the channel or of the service highlighted in the mosaic image is received via a transmission network. For example, the information is received by reception means such as a demodulator 4 and a demultiplexer making it possible to receive audio/video data from the transmission network. This variant has the advantage of not consuming bandwidth of the digital network 6. Moreover, the information received from the transmission network is directly usable when the user selects the channel or the service by pressing the "OK" key. The image of the selected channel is immediately full-screen.

According to a variant, the server 20 delivers as many video streams as there are images in the mosaic. In this way, the receiver 1 displays a certain number of video streams in the mosaic, thus guaranteeing the updating and great visual comfort. Advantageously, the video streams transmitted by the server are degraded streams, but that is sufficient since the images appear in small format.

According to a variant, the list of channels forming the mosaic image is transmitted by the receiver 1 to the server 20 via the digital network 6. The server takes over from the receiver 1 to collect the images, and generate a global image corresponding to the mosaic image required by a receiver 1. For this, the receiver 1 first sends a request containing the map of the desired mosaic to the server 20. The latter then searches the images of the different channels or services selected by the user, composes a mosaic image and transmits it to the receiver 1. The receiver 1 applies the graphic distinction to an area of the received mosaic image. This graphic distinction is displaced according to navigation commands entered by the user. Using the mapping table illustrated by table 2, the application can retrieve from the highlighted area, the audio URL and the video URL of the channel or of the digital service selected by the user. As previously, the mosaic application launches a request to receive the audio stream of the graphically highlighted channel or service. The audio stream is received independently of the mosaic image stream.

The advantage of this variant lies in the fact that the receiver does not need to be equipped with means of producing a mosaic image, and globally the quantity of data transmitted over the digital network 6 is optimized. In practice, instead of sending an equal number of requests as there are images in the mosaic and receiving as much image data, a single request is sufficient which leads to the reception of a single packet of image information. A variant of this embodiment consists in having the server 20 generate a mosaic image stream. The receiver launches a request to open with the server 20 an RTSP-type session for the transmission of a video stream transmitting the customized mosaic images to this receiver. The video stream can be interrupted by a new request from the decoder, for example when the user selects a channel to view it full-screen.

Although the present invention has been described with reference to the particular embodiments illustrated, it is by no means limited by these embodiments, but is limited only by the appended claims.

The invention claimed is:

1. A method of creating a mosaic image by a content provider server and displaying the mosaic image by an audiovisual receiver, said mosaic image consisting of a plurality of visual data originating from and graphically identifying audiovisual channels, the method comprising:

generating by a receiver a list containing at least two identifiers, each identifier identifying an audiovisual channel, transmitting by the receiver to a content provider server the list containing the at least two identifiers, wherein said generating and transmitting are performed in response to a user's launching of a mosaic application at the receiver, receiving a mosaic image created in the content provider server by aggregating the visual data originating from each audiovisual channel identified by the identifiers in the list generated by the receiver, and displaying by the receiver the received mosaic image.

2. The method of creating and displaying a mosaic image as claimed in claim 1, further comprising,
graphically highlighting, by the receiver, a visual data of the displayed mosaic image identifying a current audiovisual channel and
receiving an audio stream corresponding to this current audiovisual channel sent by a unidirectional transmission network.

3. The method of creating and displaying a mosaic image as claimed in claim 1, further comprising,
graphically highlighting, by the receiver, a visual data of the displayed mosaic image identifying a current audiovisual channel and
receiving an audio stream corresponding to this current audiovisual channel sent by the server.

4. The method of creating and displaying a mosaic image as claimed in claim 1; wherein the server generates a mosaic image stream and transmits the stream data to the receiver.

5. An audiovisual receiver configured to receive a mosaic image created by a content provider server, said audiovisual receiver comprising:
a means of generating a list containing at least two identifiers, each identifier identifying an audiovisual channel,
a means of transmitting to a content provider server the list containing the of at least two identifiers, said generation and transmission being performed in response to a user's launching of a mosaic application at the receiver,
a means of receiving a mosaic image from the content provider server, said mosaic image consisting of a plurality of visual data originating from and graphically identifying the audiovisual channels, said mosaic image being created by aggregating the visual data originating from each audiovisual channel identified by the identifiers contained in the list, and
a means of displaying the received mosaic image.

6. The audiovisual receiver as claimed in claim 5; further comprising:
a means of graphically highlighting a visual data of the displayed mosaic image identifying a current audiovisual channel, and
a means of receiving an audio stream corresponding to this current audiovisual channel sent by the server.

7. The audiovisual receiver as claimed in claim 5; further comprising:
a means of graphically highlighting a visual data of the displayed mosaic image identifying a current audiovisual channel and
a means of receiving an audio stream corresponding to this current audiovisual channel sent by a unidirectional transmission network.

8. A communication server configured to create a mosaic image, said mosaic image consisting of a plurality of visual data originating from and graphically identifying audiovisual channels, the communication server comprising:
a means of communicating with an identified audiovisual receiver; wherein the communication means receives from the receiver a list containing at least two identifiers, each identifier identifying an audiovisual channel, and wherein the communication means receives the list from the receiver in response to a user's launching of a mosaic application at the receiver, and
a means of creating a mosaic image by aggregating the visual data originating from each audiovisual channel identified by the identifiers contained in the list from the receiver, wherein the communication means transmits to the identified receiver the created mosaic image for display purposes.

9. The communication server as claimed in claim 8; wherein the communication means receives from the identified receiver an identifier identifying a current audiovisual channel, and transmits an audio stream corresponding to this current audiovisual channel.

10. The communication server as claimed in claim 8; wherein the communication means transmits to the identified receiver a mosaic image stream.

11. An audiovisual receiver configured to receive a mosaic image created by a content provider server, said audiovisual receiver comprising at least one processing circuitry and at least one memory configured to:
generate a list containing at least two identifiers, each identifier identifying an audiovisual channel,
transmit to a content provider server the list containing the at least two identifiers, said generation and transmission being performed in response to a user's launching of a mosaic application at the receiver,
receive a mosaic image from the content provider server, said mosaic image consisting of a plurality of visual data originating from and graphically identifying audiovisual channels, said mosaic image being created by aggregating the visual data originating from each audiovisual channel identified by the identifiers contained in the list, and
display the received mosaic image.

\* \* \* \* \*

UNITED STATES PATENT AND TRADEMARK OFFICE
CERTIFICATE OF CORRECTION

PATENT NO. : 9,888,213 B2
APPLICATION NO. : 12/308315
DATED : February 6, 2018
INVENTOR(S) : Jean-Baptiste Henry Page 1 of 1

It is certified that error appears in the above-identified patent and that said Letters Patent is hereby corrected as shown below:

On the Title Page

Item (54) and in the Specification, Column 1, Lines 1-4, Title should be changed to read:
METHOD FOR DISPLAYING A MOSAIC IMAGE IN A RECEIVER FOR THE SELECTION OF AUDIOVISUAL PROGRAMS, RECEIVERS AND RELATED SERVERS Signed and Sealed this
Eleventh Day of June, 2019

Andrei Iancu
*Director of the United States Patent and Trademark Office*